(12) United States Patent
Takatani et al.

(10) Patent No.: US 10,297,033 B2
(45) Date of Patent: May 21, 2019

(54) INFORMATION PROCESSING APPARATUS AND METHOD (71) Applicant: KABUSHIKI KAISHA TOSHIBA, Tokyo (JP)

(72) Inventors: Tsuyoshi Takatani, Kanagawa (JP); Tsuyoshi Tasaki, Kanagawa (JP); Manabu Nishiyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 48 days.

(21) Appl. No.: 15/444,645

(22) Filed: Feb. 28, 2017

(65) Prior Publication Data

US 2017/0345161 A1 Nov. 30, 2017

(30) Foreign Application Priority Data

May 31, 2016 (JP) .................................. 2016-108884

(51) Int. Cl.
*G06T 7/246* (2017.01)
*G06T 7/73* (2017.01)
*G06K 9/46* (2006.01)
*G06K 9/00* (2006.01)

(52) U.S. Cl.
CPC ............ *G06T 7/246* (2017.01); *G06K 9/4671* (2013.01); *G06T 7/73* (2017.01); *G06K 9/00214* (2013.01); *G06T 2207/10016* (2013.01)

(58) Field of Classification Search
CPC combination set(s) only.
See application file for complete search history.

(56) References Cited

U.S. PATENT DOCUMENTS

| 7,752,008 B2* | 7/2010 | Satoh .................... G06K 9/3208 702/150 |
| 8,571,789 B2 | 10/2013 | Monde et al. |
| 9,071,829 B2* | 6/2015 | Michot .............. H04N 13/0221 |
| 9,097,541 B2* | 8/2015 | Bando .................... G01C 21/28 |
| 2005/0256391 A1* | 11/2005 | Satoh ........................ G06T 7/33 600/407 |
| 2005/0261573 A1* | 11/2005 | Satoh .................... G06K 9/3208 600/415 |

(Continued)

FOREIGN PATENT DOCUMENTS

JP  11-023291  1/1999
JP  4854788  11/2011

(Continued)

*Primary Examiner* — Anand P Bhatnagar
(74) *Attorney, Agent, or Firm* — Nixon & Vanderhye, P.C.

(57) ABSTRACT

According to one embodiment, an information processing apparatus includes processing circuitry. The processing circuitry acquires a measurement value including an acceleration, corrects the measurement value to reduce a drift in the measurement value, acquires a first image and a second image, detects feature points in the first and the second images, identify a corresponding point among the feature points in the second image, which corresponds to one of the feature points in the first image, and estimate a relative displacement of a moving object between a time at which the first image is taken and a time at which the second image is taken, based on the corrected measurement value, the feature point in the first image and the corresponding point in the second image.

18 Claims, 7 Drawing Sheets (56) References Cited

U.S. PATENT DOCUMENTS

| | | | |
|---|---|---|---|
| 2007/0253618 A1* | 11/2007 | Kim | G06T 7/80 |
| | | | 382/154 |
| 2007/0297695 A1* | 12/2007 | Aratani | G06K 9/3216 |
| | | | 382/284 |
| 2008/0144925 A1* | 6/2008 | Zhu | G06K 9/32 |
| | | | 382/154 |
| 2011/0096957 A1* | 4/2011 | Anai | G01C 11/10 |
| | | | 382/106 |
| 2011/0157373 A1* | 6/2011 | Ye | G06T 7/85 |
| | | | 348/187 |
| 2017/0257572 A1* | 9/2017 | Wu | H04N 5/23254 |
| 2018/0041708 A1* | 2/2018 | Wu | G06T 7/277 |

FOREIGN PATENT DOCUMENTS

| | | |
|---|---|---|
| JP | 2012-133696 | 7/2012 |
| JP | 2014-240266 | 12/2014 |

\* cited by examiner

F I G. 1

F I G. 2

F I G. 3

F I G. 4

F I G. 5

F I G. 6

F I G. 7

US 10,297,033 B2

INFORMATION PROCESSING APPARATUS AND METHOD

CROSS-REFERENCE TO RELATED APPLICATIONS

This application is based upon and claims the benefit of priority from Japanese Patent Application No. 2016-108884, filed May 31, 2016, the entire contents of which are incorporated herein by reference.

FIELD

Embodiments described herein relate generally to an information processing apparatus and a method.

BACKGROUND

Techniques for estimating self-motion of a moving object are applied to automobiles, ships, airplanes, and the like for the purpose of estimating the self-position.

DETAILED DESCRIPTION

Various embodiments will be described hereinafter with reference to the accompanying drawings.

In general, according to one embodiment, an information processing apparatus includes a memory and processing circuitry. The processing circuitry is configured to: acquire a measurement value including an acceleration; correct the measurement value to reduce a drift in the measurement value; acquire a first image and a second image taken at a different time from the first image; detect feature points in the first and the second images; identify a corresponding point among the feature points in the second image, the corresponding point corresponding to one of the feature points in the first image; and estimate a relative displacement of a moving object between a time at which the first image is taken and a time at which the second image is taken, based on the corrected measurement value, the feature point in the first image, and the corresponding point in the second image.

First Embodiment

Figure 1:
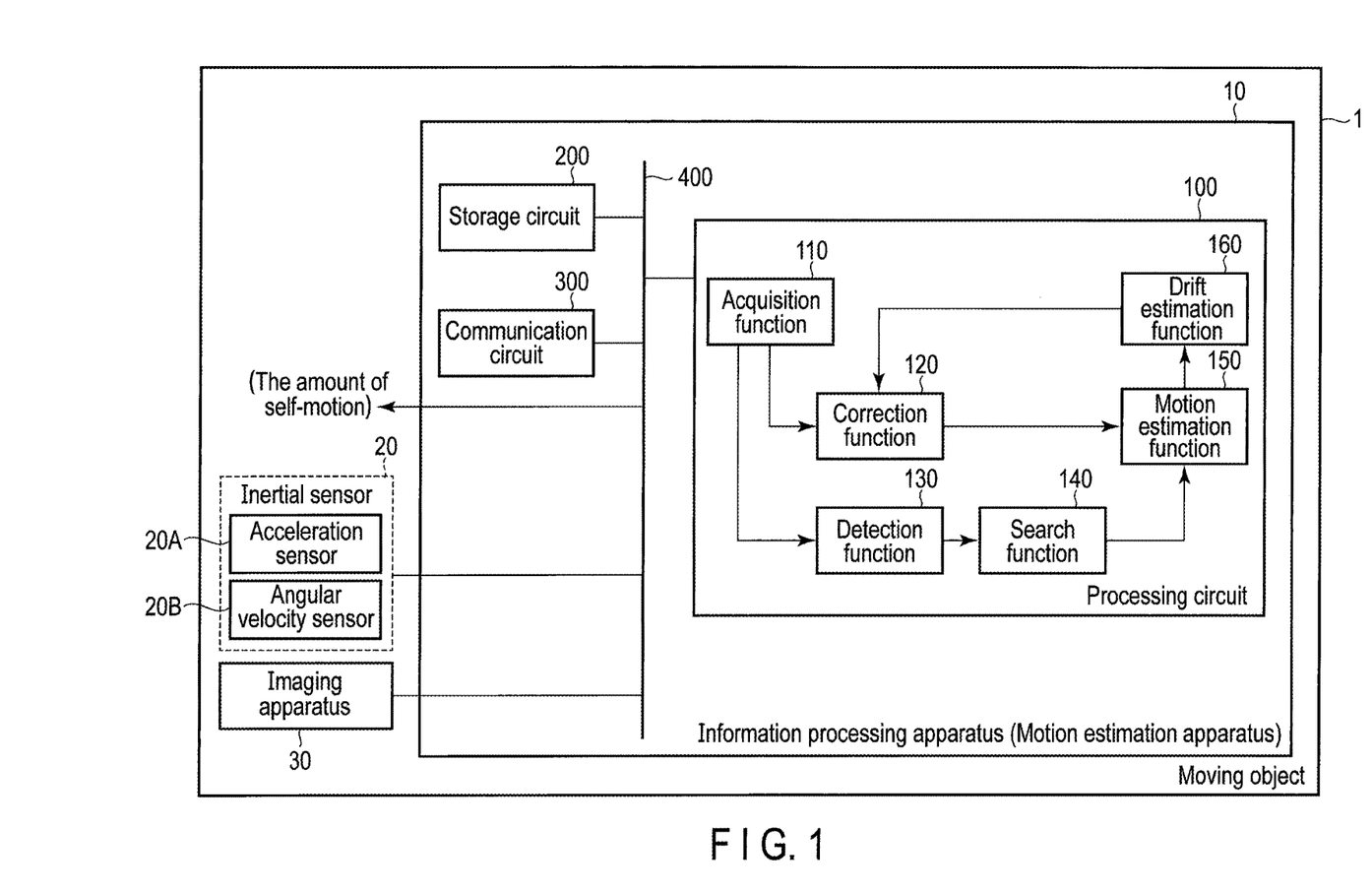
FIG. 1 is a block diagram showing an example of a configuration of an information processing apparatus according to a first embodiment.

FIG. 1 is a block diagram showing an example of a configuration of an information processing apparatus 10 according to the present embodiment. The information processing apparatus 10 is used as a motion estimation apparatus for estimating a self-position of a moving object 1. The self-position means the position and the posture of moving object 1. The moving object 1 is, for example, a vehicle (automobile, two-wheeled vehicle, etc.), a ship, an airplane, or a drone.

The moving object 1 is provided with an inertial sensor 20 and an imaging apparatus 30. In the present embodiment, an example is described in which one inertial sensor 20 and one imaging apparatus 30 are provided, respectively, but a plurality of inertial sensors 20 and imaging apparatus 30 may be provided.

An acceleration sensor, an angular velocity sensor, a posture sensor, a direction sensor, a velocity sensor, or the like may be used as the inertial sensor 20. In the present embodiment, an example using a triaxial acceleration sensor (acceleration sensor 20A) and a triaxial angular velocity sensor (angular velocity sensor 20B) will be described. Hereinafter, the acceleration sensor 20A and the angular velocity sensor 20B may be collectively referred to as an inertial sensor 20. Therefore, acceleration components in the x, y, z directions and rotational speed components around the x, y, z axes are acquired as measurement values of the inertial sensor 20. It should be noted that, for example, in the case where the movement of the moving object 1 is only plane movement, the acceleration sensor 20A alone may be used.

A visible light camera, an infrared light camera, an ultraviolet light camera, or the like may be used as the imaging apparatus 30, but an example using a visible light camera of perspective projection will be described here.

The information processing apparatus 10 estimates the self-motion of the moving object 1 using measurement values obtained with the acceleration sensor 20A and the angular velocity sensor 20B and an image captured by the imaging apparatus 30. The self-motion means the movement of position and the posture of the moving object 1. It is possible to estimate the self-position of moving object 1 by accumulating this self-motion.

It is known that drift occurs in the inertial sensor 20 due to error caused by vibration, heat, or the like. Therefore, in order to estimate the self-position of the moving object 1 using only the measurement value of the inertial sensor 20, even with a slight drift, the accumulation increases the error and accordingly, the error of the self-position increases.

In order to cope with such a phenomenon, the amount of drift of the inertial sensor 20 is considered to be estimated by separately estimating the self-motion of the moving object 1 by using an image captured by the imaging apparatus 30 and performing comparison with the self-motion of the moving object 1 estimated using the measurement value measured by the inertial sensor 20. However, the result of the self-motion estimation using only the image captured by the imaging apparatus 30 is not always reliable, and it is known that the error increases in situations where feature points cannot be detected from the captured image. When the amount of drift of the inertial sensor 20 is estimated by using a self-motion estimation result including a large error, the error of the drift estimation result also becomes large. For example, in a situation where a self-motion estimation using an image captured by the imaging apparatus 30 is difficult (a situation where it is difficult to detect a feature point from a captured image) such as when a moving object 1 is a car and traveling in a tunnel, the drift correction is performed by using the amount of drift estimated including a large error in the case of the above measures, so that the error of the final self-position is large.

Thus, the information processing apparatus 10 estimates the self-motion of the moving object 1 by using the measurement value measured by the inertial sensor 20 and the image captured by the imaging apparatus 30, and estimates the amount of drift of the inertial sensor 20. Therefore, even in a situation where it is difficult to perform the self-motion estimation by using the image captured by the imaging apparatus 30, an increase in the error of the drift estimation is suppressed, and the error of the self-position estimation can be reduced. This point will be described in detail below.

The information processing apparatus 10 is, for example, a dedicated or general-purpose computer, and includes a processing circuit 100, a storage circuit 200, a communication circuit 300, and a bus 400 connecting each circuit.

The processing circuit 100 includes an acquisition function 110, a correction function 120, a detection function 130, a search function 140, a motion estimation function 150, and a drift estimation function 160. Each of these processing functions will be described later. Each of these processing functions is stored in the storage circuit 200 in the form of a computer executable program. The processing circuit 100 is a processor that realizes a processing function corresponding to each program by reading and executing a program from the storage circuit 200. The processing circuit 100 in a state where each program has been read has each processing function shown in the processing circuit 100 of FIG. 1. It should be noted that the processing circuit 100 may be configured as a single processor or as a combination of multiple independent processors. For example, the processing circuit 100 may be configured by combining multiple independent processors, and each processor executes a program so as to realize each processing function shown in the processing circuit 100 of FIG. 1. Alternatively, for example, certain processing functions may be implemented in dedicated and independent processors.

The term "processor" used herein means, for example, circuits such as a central processing unit (CPU), a graphical processing unit (GPU), an application specific integrated circuit (ASIC), a programmable logic device (for example, a simple programmable logic device (SPLD), a complex programmable logic device (CPLD), a field programmable gate array (FPGA), and the like). The processor realizes the processing function by reading and executing the program stored in the storage circuit 200. Instead of storing the program in the storage circuit 200, the program may be configured to be directly incorporated into the circuit of the processor. In this case, the processor realizes the processing function by reading and executing the program incorporated in the circuit.

The storage circuit 200 stores, as necessary, data and the like relating to each processing function performed by the processing circuit 100. For example, the storage circuit 200 is a semiconductor memory device such as a RAM (Random Access Memory) or a flash memory, a hard disk, an optical disk, or the like. The storage circuit 200 may be a storage medium storing or temporarily storing a program downloaded via a local area network (LAN), the Internet, or the like. It should be noted that the storage medium is not limited to a single storage medium, and the case where each processing function of the processing circuit 100 is realized from multiple storage media is also included in the storage medium in the present embodiment, and the configuration of the storage medium may have any of the configurations.

The communication circuit 300 is an interface for inputting and outputting information into and from an external apparatus connected by wire or wirelessly. The communication circuit 300 may communicate by connecting to a network.

Here, first, each processing function of the processing circuit 100 will be briefly described.

The acquisition function 110 acquires a measurement value including a drift measured by the inertial sensor 20, i.e., the acceleration sensor 20A and the angular velocity sensor 20B, and an image captured by the imaging apparatus 30.

The correction function 120 corrects the measurement value acquired by the acquisition function 110 to remove (reduce) drifts contained in the measurement value. This correction is executed using that amount of drift in a case where there is an amount of drift estimated by the drift estimation function 160 described later. In a case where there is no drift, the correction is executed by using an amount of drift that has been set in advance.

The detection function 130 detects a feature point from the image acquired by the acquisition function 110. A feature point is an edge point, a corner point, or the like, and means a place where correspondence can be easily obtained between multiple images. Basically, it is assumed that multiple feature points are detected.

The search function 140 searches (identifies) a corresponding point corresponding to a feature point detected from an image (first image) acquired at a certain timing from an image (second image) acquired at a timing different from the timing at which the image was acquired. More specifically, the corresponding point corresponding to the feature point in the first image is searched from the feature point detected from the second image. The interval between the timing at which the first image is acquired and the timing at which the second image is acquired is, for example, the interval with which the imaging apparatus 30 captures images. Whichever of the first image and the second image may be captured first. In the present embodiment, an example will be described in which the first image is first imaged and the second image is later imaged.

The motion estimation function 150 estimates the relative amount of movement (relative displacement) of the moving object 1 between acquisition of first image and acquisition of second image, by using the measurement value corrected by the correction function 120, the feature point in the first image, and the corresponding point in the second image. The configuration of the motion estimation function 150 will be described further below. The amount of movement estimated by motion estimation function 150 is output as a processing result of processing circuit 100 (self—the amount of movement).

The drift estimation function 160 estimates the amount of drift in the measurement value, by using the amount of movement estimated by the motion estimation function 150 and the measurement value corrected by the correction function 120. The amount of drift estimated by the drift estimation function 160 is used for correction by the correction function 120 for the measurement value acquired subsequently to the acquisition function 110.

Figure 2:
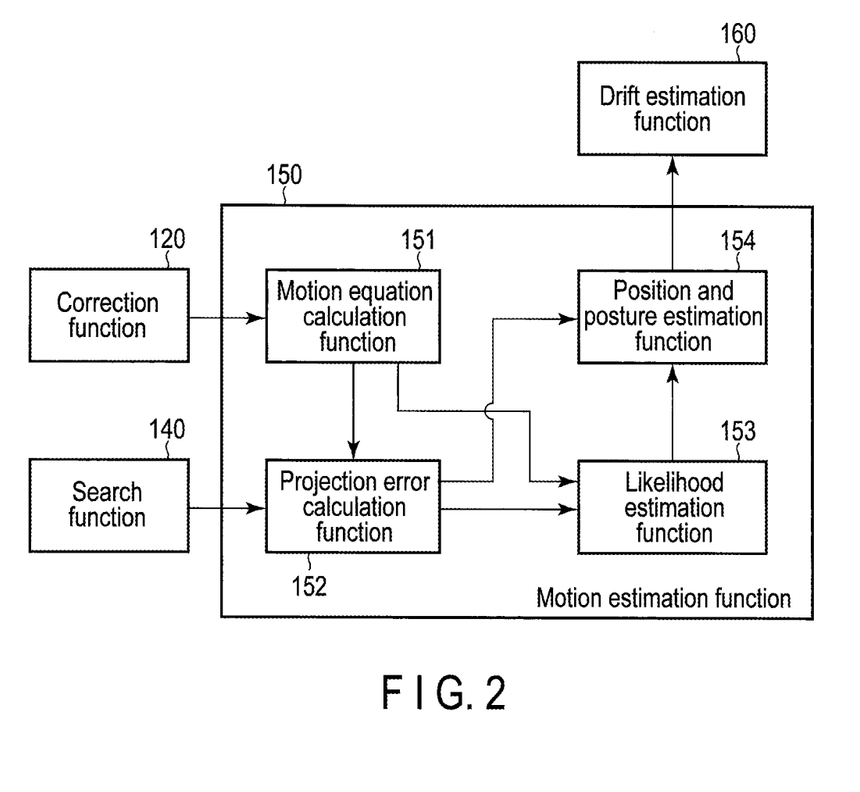
FIG. 2 is a block diagram showing an example of a configuration of a motion estimation function of the information processing apparatus according to the first embodiment.

FIG. 2 is a block diagram showing an example of the configuration of the motion estimation function 150.

The motion estimation function 150 includes a motion equation calculation function 151, a projection error calculation function 152, a likelihood estimation function 153, and a position and the posture estimation function 154. Here, first, each processing function provided in the motion estimation function 150 will be briefly described.

The motion equation calculation function 151 calculates the position, the posture, and the speed of the moving object 1, by substituting the measurement value corrected by the correction function 120 into the motion equation. The position indicates the amount of movement of the position of moving object 1. The posture indicates the amount of movement of the posture of moving object 1. The self-position of the moving object 1 can be estimated by accumulating the amount of movement of the position and the posture.

The projection error calculation function 152 calculates a difference (reprojection error) between the position (two-dimensional position) in the first image obtained by projecting, onto the first image, a corresponding point in the second image searched by the search function 140, which is estimated using the position and the posture calculated by motion equation calculation function 151, and the position (2D position) of the actual feature point in the first image.

The likelihood estimation function 153 estimates the likelihood of the position and the posture calculated by motion equation calculation function 151 and the likelihood of the 3D position of the feature point in the first image calculated with the projection error calculation function 152 (to calculate the reprojection error), by using error models configured for each of the position and the posture and the reprojection error.

The position and the posture estimation function 154 estimates the position and the posture of the moving object 1 determined when the likelihood estimated by the likelihood estimation function 153 is the maximum.

Figure 3:
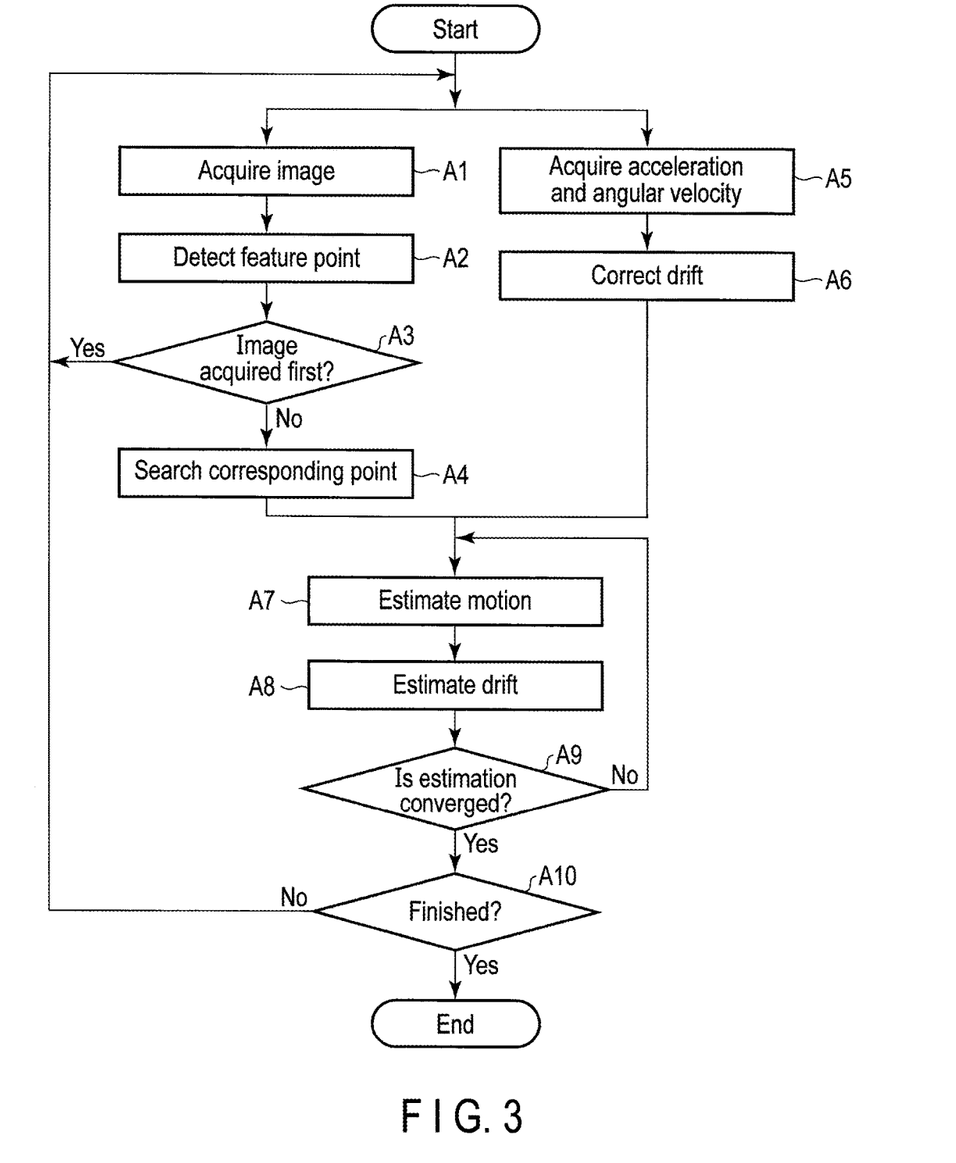
FIG. 3 is a flowchart showing an example of a flow of processing executed by the information processing apparatus according to the first embodiment.

FIG. 3 is a flowchart showing an example of a flow of processing executed by the processing circuit 100. Each processing function provided in the processing circuit 100 will be described in detail with reference to FIG. 3.

The acquisition function 110 acquires the image captured by the imaging apparatus 30 (step A1). The acquisition function 110 acquires acceleration (including drift) measured by the acceleration sensor 20A and an angular velocity measured by the angular velocity sensor 20B (including drift) in parallel with acquisition of the image (step A5). In FIG. 3, step A1 to step A4 and step A5 to step A6 are shown as parallel processing, but step A1 to step A4 and step A5 to step A6 may be sequential processing instead.

The detection function 130 detects a feature point from the acquired image (step A2). For example, corner detection by Harris operator, edge detection by Kirsch operator, and the like can be used for detection of the feature point.

When the image acquired by the acquisition function 110 and from which the feature point is detected by the detection function 130 is the image acquired first (step A3, Yes), the processing returns back to the acquisition of image by the acquisition function 110 in step A1 and the acquisition of the acceleration and the angular velocity by the same acquisition function 110 in step A5. It is to be understood that the first image used in the explanation here can include the image acquired first, but the first image used in the explanation here has a meaning different meaning from the image acquired first.

When the image acquired by the acquisition function 110 and from which the feature point is detected by the detection function 130 is not the image acquired first (step A3, NO), the search function 140 searches, from an image acquired most recently (second image), the corresponding point corresponding to the feature point detected from the image (first image) acquired immediately before the image acquired first (step A4). For example, correspondence based on template matching, correspondence based on feature quantities such as SURF feature quantity, SIFT feature quantity, AKAZE feature quantity, and the like can be used for the search of corresponding points.

The correction function 120 also corrects the acquired acceleration and the acquired angular velocity to remove drifts contained in the acceleration and the angular velocity (step A6). More specifically, the correction function 120 removes the drift included in the measurement value of the inertial sensor 20 by subtracting the amount of drift estimated by the drift estimation function 160 from the measurement value of the inertial sensor 20 in step A8 described later. Under the circumstance where the drift has never been estimated by the drift estimation function 160 in step A8, the correction function 120 makes use of the amount of drift that has been set in advance.

The motion estimation function 150 estimates the relative amount of movement of the moving object 1 between the acquisition of the first image and the acquisition of the second image by using the acceleration and the angular velocity corrected by the correction function 120, the feature point in the first image detected by the detection function 130, and the corresponding point in the second image searched by the search function 140 (step A7).

Figure 4:
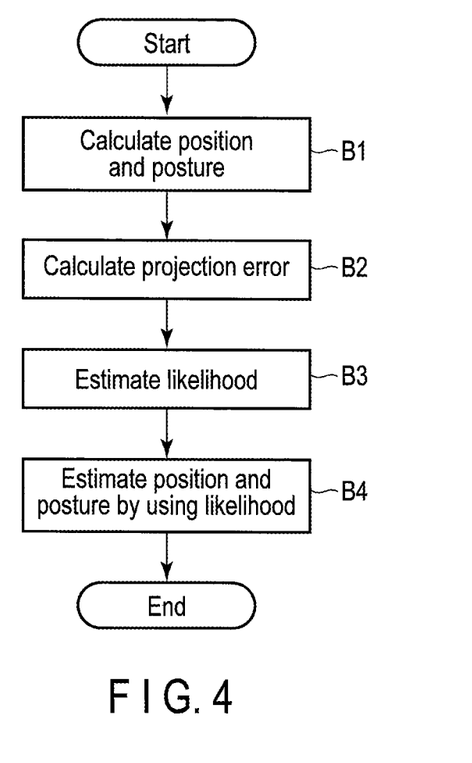
FIG. 4 is a flowchart showing an example of a flow of processing of motion estimation in processing executed by the information processing apparatus according to the first embodiment.

FIG. 4 is a flowchart showing an example of a flow of processing of motion estimation by the motion estimation function 150 in step A7 of FIG. 3. Each processing function provided in the motion estimation function 150 shown in FIG. 2 will be described in detail with reference to FIG. 4.

The motion equation calculation function 151 calculates the position, the speed, and the posture of the moving object 1 based on the acceleration and the angular velocity (step B1). The position, the speed, and the posture of the moving object 1 when the first image is acquired are denoted as t(1), v(1), R(1), respectively, and the position, the speed, and the posture of the moving object 1 when the second image is acquired are denoted as t(2), v(2), R(2), respectively. Here, t(•) and v(•) are three-dimensional vectors, and R(•) is a 3×3 matrix. The acceleration is defined as a, and the angular velocity is defined as ω. Here, a and ω are three-dimensional vectors. In this case, t(2), v(2), R(2) can be calculated by the expressions (1) to (3).

$$t(2) = t(1) + v(1)\tau + \tfrac{1}{2}g\tau^2 + \tfrac{1}{2}R(1)a\tau^2 \quad (1)$$

$$v(2) = v(1) + g\tau + R(1)a\tau \quad (2)$$

$$R(2) = R(1)\Omega\tau \quad (3)$$

In this case, g denotes the gravitational acceleration, τ denotes a time between the acquisition time of the first image and the acquisition time of the second image, and Ω denotes the rotation matrix of angular velocity ω. In the case where t(1), v(1), R(1) are unknown, t(1)=(0, 0, 0)T, v(1)=(0, 0, 0)T, R(1)=I (unit matrices) are used. The case where t(1), v(1), R(1) are unknown, the case of the initial state when the processing circuit 100 starts the processing.

The projection error calculation function 152 computes a re-projection error on the feature point in the first image and the corresponding point in the second image by using t(1), R(1), t(2), R(2) (Step B2). The position of the feature point in the first image is denoted as $(x_1, y_1)$, and the position of the corresponding point in the second image is denoted as $(x_2, y_2)$. In the case where the three-dimensional position $(X, Y, Z)$ of the feature point is known, the reprojection position $(x, y)$, in the first image, of the corresponding point of the second image can be calculated by using the expressions (4) to (5).

$$x = \frac{X}{Z} \tag{4}$$

$$y = \frac{Y}{Z} \tag{5}$$

The reprojection error can be calculated by using the reprojection position, and for example, the reprojection error (error e) for the position of the feature point in the first image can be calculated by the expression (6).

$$\|e\| = \|(x - x_1, y - y_1)\| = \sqrt{(x - x_1)^2 + (y - y_1)^2} \tag{6}$$

In the case where the three-dimensional position of the feature point is unknown, and the feature point position in the two images and the relative position and the relative posture between the images are known, the three-dimensional position of the feature point can be estimated by triangulation. The case where the three-dimensional position of the feature point is unknown is the case where the feature point has appeared (detected) for the first time. The amounts of changes in the relative position and the relative posture between two images are denoted as t, R, respectively. Here, the first row of a 3×3 matrix R, which is a three-dimensional vector of $t = (t_x, t_y, t_z)^T$ is denoted as $r_1$, and the second row thereof is denoted as $r_2$, and the third row thereof is denoted as $r_3$. The three-dimensional position of the feature point $(X, Y, Z)$ is calculated by the expressions (7) to (9).

$$Z = \frac{t_x - \frac{x_2}{y_2} t_y}{\frac{x_2}{y_2} r_2 \cdot o_1 - r_1 \cdot o_1} \tag{7}$$

$$X = x_1 Z \tag{8}$$

$$Y = y_1 Z \tag{9}$$

Here, $o_1 = (x_1, x_y, 1)^T$ holds.

The likelihood estimation function 153 estimates the likelihood of the position and the posture of the moving object 1 calculated by the motion equation calculation function 151 and the likelihood of the three-dimensional position of the feature point calculated by projection error calculation function 152 (step B3).

As described above, the reprojection error (error e) can be calculated by the expression (6). The likelihood L of the three-dimensional position of the feature point is calculated by the expression (10) using this error e.

$$L = \exp\left(-\frac{1}{2} \|e\|_\Sigma^2\right) \tag{10}$$

Here, $\Sigma$ denotes an error variance of the two-dimensional position of the feature point. A matrix into which the position and the posture of the moving object 1 are made will be referred to as a pose. The pose is defined by the expression (11).

$$P = \begin{bmatrix} R(1) & t(1) \\ 0 & 0 & 0 & 1 \end{bmatrix} \tag{11}$$

Let t' and R' be the estimation values for the position and the posture of the moving object 1, and the expression (12) is defined.

$$P' = \begin{bmatrix} R' & t' \\ 0 & 0 & 0 & 1 \end{bmatrix} \tag{12}$$

Using these, the error $e_p$ for the pose can be calculated by the expression (13).

$$e_p = p^{-1} p' = \begin{bmatrix} R_e & t_e \\ 0 & 0 & 0 & 1 \end{bmatrix} \tag{13}$$

Here, $R_e$ means the error of the posture. $t_e$ means the error of the position. The posture error $R_e$ made from rotation matrix representation into rotation vector representation will be denoted as $r_e$. Using these, the likelihood $L_p$ for the pose is calculated by the expression (14).

$$L_p = \exp\left(-\frac{1}{2} \|t_e\|_{\Sigma_t}^2 - \frac{1}{2} \|r_e\|_{\Sigma_r}^2\right) \tag{14}$$

Here, $\Sigma_t$ is an error covariance of the position, and $\Sigma_r$ is an error covariance of the posture.

The position and the posture estimation function 154 estimates the position and the posture of the moving object 1 that attain the maximum likelihood estimated by the likelihood estimation function 153 (step B4).

The Gauss-Newton method and the Levenberg-Marquardt method can be used for this. In this case, the case of using the Gauss-Newton method will be described, but a Levenberg-Marquardt method, a conjugate gradient method, or the like may be used. The detection function 130 detects N feature points. Since one expression (10) can be defined for one feature point, and therefore, N expressions (10) can be defined for N feature points, and they are expressed as the expression (15).

$$L_i = \exp\left(-\frac{1}{2} \|e_i\|_{\Sigma_i}^2\right) \tag{15}$$

Here, $1 \le i \le N$ holds. At this time, the problem of maximizing the expression (16) is equivalent to the problem of minimizing the expression (17), and the Gauss-Newton method can be applied.

$$f = L_p L_1 L_2 \ldots L_N \tag{16}$$

$$E = \frac{1}{2}\left(\|t_e\|_{\Sigma_t}^2 + \|r_e\|_{\Sigma_r}^2 + \|e_1\|_{\Sigma_1}^2 + \|e_2\|_{\Sigma_2}^2 + \ldots + \|e_N\|_{\Sigma_N}^2\right) \tag{17}$$

Where estimation values t', R' for the position and the posture of the moving object 1 and estimation values $(X_i', Y_i', Z_i')$ $(1 \le i \le N)$ for the three-dimensional position of the feature point is made into a set of parameters x, the parameters from x to x+δx are updated using an appropriate update amount δx and repeating this until the parameters converge in the Gauss-Newton method. In the expression (17), $t_e$ and $r_e$ are three-dimensional vectors, and $e_i$ is a two-dimensional vector. Using this as a set, (6+2*N)-th dimensional vector is made, and this is defined as z. The Jacobian matrix of z can be calculated by the expression (18).

$$J = \frac{dz}{dx} \quad (18)$$

By using this Jacobi matrix, the aforementioned parameter update amount δx is calculated by the expression (19).

$$\delta x = -(J^T J)^{-1} J^T z \quad (19)$$

The position and the posture of the moving object 1 and the three-dimensional position of the feature point are simultaneously estimated by updating the parameter using parameter update amount δx calculated by the expression (19). The expression (17) is recalculated by using the updated position and the updated posture of the moving object 1 and the three-dimensional position of the feature point, and a convergence is determined when E becomes smaller than a setting value. When not converged, the gauss-Newton method is executed again. In the determination of the convergence, the magnitude of the parameter update amount δx can also be used, and when the magnitude becomes smaller than the setting value, the convergence is determined.

FIG. 3 will be referred to again.

The drift estimation function 160 estimates the second amount of drift by using the position and the posture of the moving object 1 estimated by the motion estimation function 150 and the acceleration and angular velocity corrected by the correction function 120 (step A8). In the expression (1) the expression (2), $a=a'+e_a$ is defined, and in the expression (3), $\omega=\omega'+e_\omega$ is defined. Here, $e_a$ and $e_\omega$ are the error of the acceleration and the error of the angular velocity, respectively, and mean components that could not be corrected by the correction function 120. $e_a$ and $e_\omega$ are calculated by using the expression (1) or the expression (2) and the expression (3). The amount obtained by adding $e_a$, $e_\omega$ to the amount of drift used for the correction function 120 is adopted as the second amount of drift.

The estimation by the motion estimation function 150 in step A7 and the estimation by the drift estimation function 160 in step A8 are alternately repeated to increase accuracy. The processing circuit 100 subtracts only $e_a$, $e_\omega$ from the acceleration and the angular velocity corrected by the correction function 120, performs step A7, and calculates the error of drift at step A8, by using the position and the posture of the moving object 1 obtained in step A7. As the accuracy increases, the change amount decreases due to repetition. When the change amount becomes smaller than the threshold value which has been set, the processing circuit 100 determines that the estimation has converged (step A9, Yes). In other words, when the change amount is not smaller than the threshold value which has been set (step A9, No), the processing circuit 100 returns back to step A7.

In a case where it is determined that the estimation has converged, and the processing circuit 100 is not commanded to terminate the processing (step A10, No), the processing circuit 100 returns back to the acquisition of the image by the acquisition function 110 in step A1 and the acquisition of the acceleration and the angular velocity by the acquisition function 110 in step A5. On the other hand, in a case where the processing circuit 100 is commanded to terminate the processing (step A10, Yes), the processing circuit 100 terminates the processing.

Figure 5:
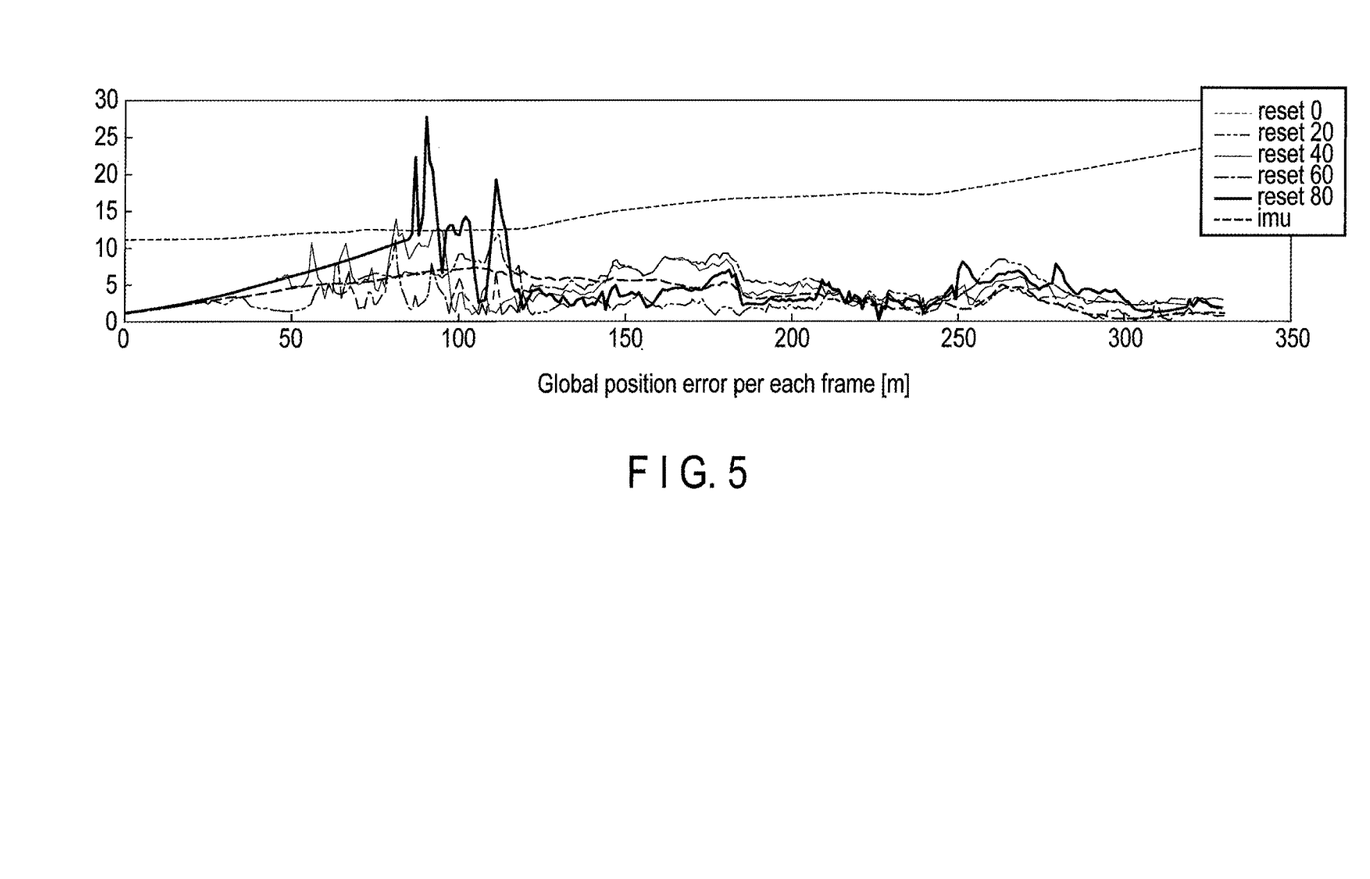
FIG. 5 is a diagram showing an example of evaluation of motion estimation error estimated by the information processing apparatus according to the first embodiment.

The effect of information processing apparatus 10 is shown in FIG. 5. FIG. 5 illustrates an example of an error when the information processing apparatus 10 performs motion estimation by using image sequences obtained during cruise of an automobile provided with an inertial measurement unit (IMU) and an imaging apparatus and measurement values of the acceleration and the angular velocity. The IMU is a unit of inertial sensor and is a generic term for units containing an acceleration sensor and an angular velocity sensor. In FIG. 5, the horizontal axis represents the frame number of image, and the vertical axis represents position error [meter]. It is assumed that feature point detection with the imaging apparatus becomes impossible at a frame number 0, and that n frames have passed from that state to where the feature point detection with the imaging apparatus can be performed. We conducted an experiment with n being 0, 20, 40, 60, and 80. For reference, it was compared with the dead reckoning method using only the IMU. According to FIG. 5, when n≤60 holds, it is possible to maintain an error smaller than that of the dead reckoning method in average. Since the frame rate of the imaging apparatus is 10 fps, the case of n=60 means 6 seconds elapsed in real time.

As described above, the information processing apparatus 10 estimates the self-motion of the moving object 1 and the amount of drift of the inertial sensor 20, by using the measurement value measured by the inertial sensor 20 and the image captured by the imaging apparatus 30, and based on the likelihood, and thus, even in a situation where it is impossible to perform the motion estimation with the image captured by the imaging apparatus 30, the error of the drift estimation is prevented from increasing, and the error of the self-position estimation can be reduced.

Second Embodiment

Subsequently, the second embodiment will be described. It should be noted that the configurations and processing operating in the same manner as those of the first embodiment will be denoted with the same reference numerals, and overlapping descriptions are omitted.

Figure 6:
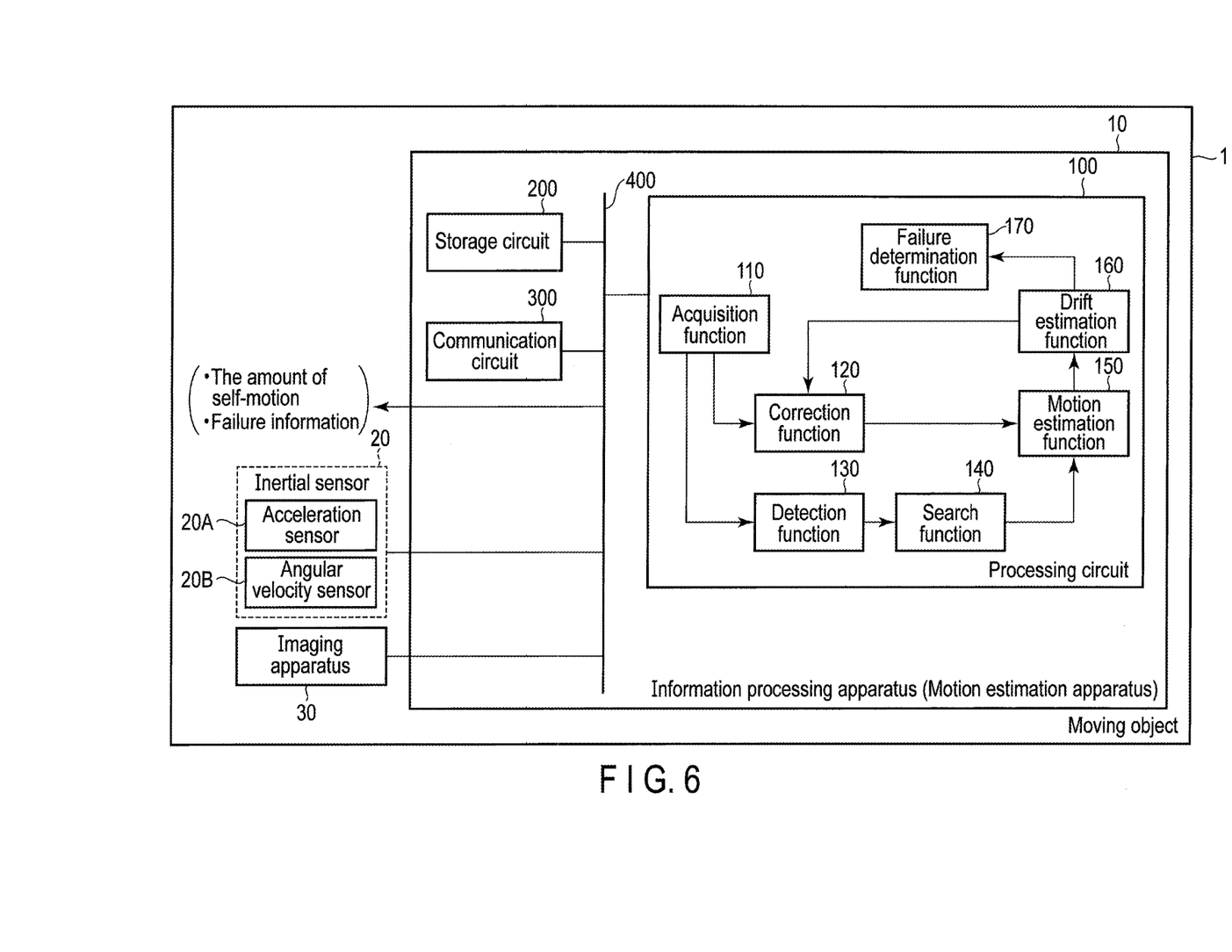
FIG. 6 is a block diagram showing an example of a configuration of an information processing apparatus according to a second embodiment.

FIG. 6 is a block diagram showing an example of a configuration of the information processing apparatus 10 according to the present embodiment. The difference from the first embodiment described above is that in the present embodiment the processing circuit 100 further includes a failure determination function 170.

In a case where the measurement value of inertial sensor 20 becomes abnormal due to a failure of the inertial sensor 20, we focus on an appearance in the estimation value of the amount of drift estimated by the drift estimation function 160, and the information processing apparatus 10 uses the estimation value of the amount of drift estimated by the drift estimation function 160 as the failure determination of the inertial sensor 20. More specifically, the failure determination function 170 perform the failure determination of the inertial sensor 20, by using the estimation value of the amount of drift estimated by the drift estimation function 160 to.

Figure 7:
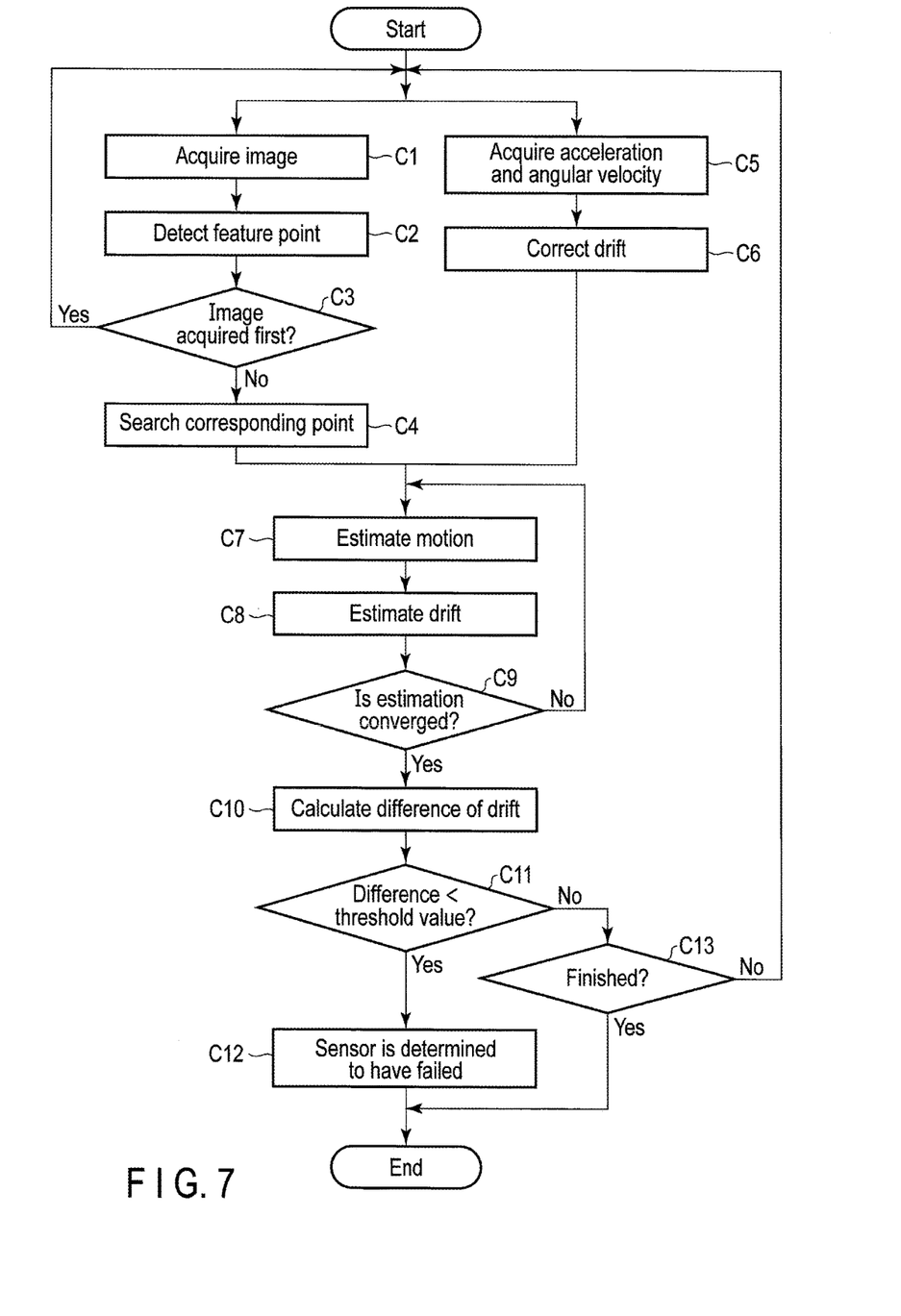
FIG. 7 is a flowchart showing an example of a flow of processing executed by the information processing apparatus according to the second embodiment.

FIG. 7 is a flowchart showing an example of a flow of processing executed by the processing circuit 100. The failure determination function 170 provided in the processing circuit 100 will be described with reference to FIG. 7.

In FIG. 7, step C1 to step C9 are processing corresponding to step A1 to step A9 in FIG. 3 described in the first embodiment, so the explanation will be omitted.

In a case where the estimation by the motion estimation function 150 in step C7 and the estimation by the drift estimation function 160 in step C8 are converged (step C9, Yes), the failure determination function 170 calculates the difference between the amount of drift used by the correction function 120 in step C6 and the amount of drift (the second amount of drift) estimated by the drift estimation function 160 in step C8 (Step C10) and compares it with the threshold value that has been set (step C11).

In the case where the difference is greater than the threshold value (step C11, Yes), the failure determination function 170 determines that the inertial sensor 20 has failed (step C12). The failure determination result of the inertial sensor 20 determined by the failure determination function 170 is output as the processing result of the processing circuit 100 (failure information). The output may be, for example, displaying a display on a display apparatus, making an alarm sound, or the like. In the case where it is determined that the inertial sensor 20 has failed, the processing circuit 100 terminates the processing.

When the difference is equal to or less than the threshold value (step C11, No), the failure determination function 170 does not determine that the inertial sensor 20 has failed. In this case, when the end of the processing is not instructed (step C13, No), the processing circuit 100 returns back to the acquisition of the image with the acquisition function 110 of step C1 and the acquisition of the acceleration and the angular velocity with the same acquisition function 110 in step C5. On the other hand, in the case where the termination of the processing is instructed (step C13, Yes), the processing circuit 100 terminates the processing.

As described above, the information processing apparatus 10 makes it possible to properly perform the failure determination of the inertial sensor 20 by using the estimation value of the amount of drift estimated by the drift estimation function 160 as the failure determination of the inertial sensor 20.

The computer according to the embodiment executes each processing in the embodiment based on a program stored in a storage medium, and may be configured in any of an apparatus including a personal computer, a micro computer, and the like, a system obtained by connecting multiple apparatuses via network, and the like.

In addition, the term "computer" in the specification collectively refers to a device and an apparatus which can realize a function in the embodiment by means of a program, such as a personal computer, an operation processing apparatus included in an information processing device, a micro computer, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory, and
processing circuitry configured to:
acquire a measurement value including an acceleration;
correct the measurement value to reduce a drift in the measurement value;
acquire a first image and a second image taken at a different time from the first image;
detect feature points in the first and the second images;
identify a corresponding point among the feature points in the second image, the corresponding point corresponding to one of the feature points in the first image; and
estimate a relative displacement of a moving object between a time at which the first image is taken and a time at which the second image is taken, based on the corrected measurement value, the feature point in the first image, and the corresponding point in the second image.

2. The information processing apparatus of claim 1, wherein the processing circuitry is further configured to:
calculate position and posture of the moving object, by using the corrected measurement value;
calculate a reprojection error corresponding to a difference between a first position in the first image and a second position in the first image, the first position being a position in the first image based on a projection of the corresponding point in the second image onto the first image, which is estimated by using the position and the posture of the moving object, the second position being an actual position of the feature point in the first image; and
estimate the relative displacement of the moving object based on the reprojection error.

3. The information processing apparatus of claim 2, wherein the processing circuitry is further configured to:
estimate a likelihood of the position and the posture of the moving object, and a likelihood of a three-dimensional position of the feature point in the first image used for calculating the reprojection error;
estimate the position and the posture of the moving object and the three-dimensional position of the feature point in the first image, based on the likelihood of the position and the posture of the moving object and the likelihood of the three-dimensional position of the feature point in the first image; and
estimate the relative displacement of the moving object, based on the position and the posture of the moving object and the three-dimensional position of the feature point in the first image that have been estimated.

4. The information processing apparatus of claim 1, wherein the processing circuitry is further configured to estimate an amount of drift of the acquired measurement value used for correction of a subsequently acquired measurement value, by using the estimated relative displacement of the moving object, the corrected measurement value, and an amount of drift used for correction of the measurement value.

5. The information processing apparatus of claim 4, wherein the processing circuitry is further configured to determine whether a sensor for measuring the measurement value fails or not, based on a difference between the amount of drift used for correction of the measurement value and the estimated amount of drift.

6. The information processing apparatus of claim 4, wherein the processing circuitry is further configured to output a determination result when the sensor for measuring the measurement value is determined to have failed.

7. A method comprising:
acquiring a measurement value including an acceleration;

correcting the measurement value to reduce a drift in the measurement value;
acquiring a first image and a second image taken at a different time from the first image;
detecting feature points in the first and the second images;
identity a corresponding point among the feature points in the second image, the corresponding point corresponding to one of the feature points in the first image; and
estimating a relative displacement of a moving object between a time at which the first image is taken and a time at which the second image is taken, based on the corrected measurement value, the feature point in the first image, and the corresponding point in the second image.

8. The method of claim 7, further comprising:
calculating position and posture of the moving object, by using the corrected measurement value;
calculating a reprojection error corresponding to a difference between a first position in the first image and a second position in the first image, the first position being a position in the first image based on a projection of the corresponding point in the second image onto the first image, which is estimated by using the position and the posture of the moving object, the second position being an actual position of the feature point in the first image; and
estimating the relative displacement of the moving object based on the reprojection error.

9. The method of claim 8, further comprising:
estimating a likelihood of the position and the posture of the moving object, and a likelihood of a three-dimensional position of the feature point in the first image used for calculating the reprojection error;
estimating the position and the posture of the moving object and the three-dimensional position of the feature point in the first image, based on the likelihood of the position and the posture of the moving object and the likelihood of the three-dimensional position of the feature point in the first image; and
estimating the relative displacement of the moving object, based on the position and the posture of the moving object and the three-dimensional position of the feature point in the first image that have been estimated.

10. The method of claim 7, further comprising estimating an amount of drift of the acquired measurement value used for correction of a subsequently acquired measurement value, by using the estimated relative displacement of the moving object, the corrected measurement value, and an amount of drift used for correction of the measurement value.

11. The method of claim 10, further comprising determining whether a sensor for measuring the measurement value fails or not, based on a difference between the amount of drift used for correction of the measurement value and the estimated amount of drift.

12. The method of claim 10, further comprising outputting a determination result when the sensor for measuring the measurement value is determined to have failed.

13. A non-transitory computer-readable storage medium having stored thereon a computer program which is executable by a computer, the computer program, when executed, controlling the computer to execute at least:
acquiring a measurement value including an acceleration;
correcting the measurement value to reduce a drift in the measurement value;
acquiring a first image and a second image taken at a different time from the first image;
detecting feature points in the first and the second images;
identity a corresponding point among the feature points in the second image, the corresponding point corresponding to one of the feature points in the first image; and
estimating a relative displacement of a moving object between a time at which the first image is taken and a time at which the second image is taken, based on the corrected measurement value, the feature point in the first image, and the corresponding point in the second image.

14. The medium of claim 13, wherein the computer program, when executed, further controls the computer to execute:
calculating position and posture of the moving object, by using the corrected measurement value;
calculating a reprojection error corresponding to a difference between a first position in the first image and a second position in the first image, the first position being a position in the first image based on a projection of the corresponding point in the second image onto the first image, which is estimated by using the position and the posture of the moving object, the second position being an actual position of the feature point in the first image; and
estimating the relative displacement of the moving object based on the reprojection error.

15. The medium of claim 14, wherein the computer program, when executed, further controls the computer to execute:
estimating a likelihood of the position and the posture of the moving object, and a likelihood of a three-dimensional position of the feature point in the first image used for calculating the reprojection error;
estimating the position and the posture of the moving object and the three-dimensional position of the feature point in the first image, based on the likelihood of the position and the posture of the moving object and the likelihood of the three-dimensional position of the feature point in the first image; and
estimating the relative displacement of the moving object, based on the position and the posture of the moving object and the three-dimensional position of the feature point in the first image that have been estimated.

16. The medium of claim 13, wherein the computer program, when executed, further controls the computer to execute estimating an amount of drift of the acquired measurement value used for correction of a subsequently acquired measurement value, by using the estimated relative displacement of the moving object, the corrected measurement value, and an amount of drift used for correction of the measurement value.

17. The medium of claim 16, wherein the computer program, when executed, further controls the computer to execute determining whether a sensor for measuring the measurement value fails or not, based on a difference between the amount of drift used for correction of the measurement value and the estimated amount of drift.

18. The medium of claim 16, wherein the computer program, when executed, further controls the computer to execute outputting a determination result when the sensor for measuring the measurement value is determined to have failed.

* * * * *